(12) United States Patent
Rubinfeld

(10) Patent No.: US 11,899,290 B1
(45) Date of Patent: Feb. 13, 2024

(54) PRISMATIC LENS

(71) Applicant: Eric Rubinfeld, Yonkers, NY (US)

(72) Inventor: Eric Rubinfeld, Yonkers, NY (US)

(*) Notice: Subject to any disclaimer, the term of this patent is extended or adjusted under 35 U.S.C. 154(b) by 0 days.

(21) Appl. No.: 18/182,353

(22) Filed: Mar. 12, 2023

(51) Int. Cl.
*G02C 7/14* (2006.01)

(52) U.S. Cl.
CPC ...................... *G02C 7/14* (2013.01)

(58) Field of Classification Search
CPC ........................................................ G02C 7/14
USPC ....... 351/41, 159.01, 159.02, 159.05, 159.17
See application file for complete search history.

(56) References Cited

U.S. PATENT DOCUMENTS

| 7,104,647 B2* | 9/2006 | Krall | G02C 7/061 |
| | | | 351/159.06 |
| 9,298,021 B2* | 3/2016 | Krall | G02C 7/065 |

\* cited by examiner

*Primary Examiner* — Tuyen Tra
(74) *Attorney, Agent, or Firm* — RC Trademark Company LLC

(57) ABSTRACT

According to some embodiments, a progressive addition lens includes a distance portion and a reading portion. The distance portion includes a fixed prism diopter power. The reading portion includes a fixed base in prism. The fixed base in prism comprises a diopter power between 0 to 10 diopters greater than the fixed prism diopter power of the distance portion.

7 Claims, 3 Drawing Sheets

PRISMATIC LENS

BACKGROUND

Glasses that use prismatic lenses are used to help people with binocular vision dysfunction. Prismatic lenses facilitate a patient's eyes to work together, which may reduce issues such as double vision, eye strain, and headaches.

Conventional ophthalmic lenses (e.g., single vision, bifocal or progressive addition lenses) are typically custom made for each patient and the lenses that require prism have a uniform amount of prism at both distance areas and near viewing areas of the lens. The prism is ground into the surface of the lens during the fabrication process of the patient's customized prescription. Patient's prismatic requirement at distance, intermediate and near distance are not the same. However, due to the physical nature of producing a prismatic lens, the maximum prism that can be produced for a patient is the amount they would need at distance viewing. A prismatic requirement at near is always more than a prismatic requirement at distance and prescribing the near prismatic amount for glasses the patient wears for all viewing would or cause visual disturbances (double vision, headaches, nausea, etc.).

A limitation of an amount of prism that can be prescribed limits the effectiveness of treating a patient's binocular issues that the patient may have at intermediate and near distances (e.g., for viewing computers and reading books). Therefore, there is a need to be able to create prismatic lenses that are capable of having a wider range of prism power ranges that can address the prismatic need at all distances. In so doing, this would help a greater number of patients and dramatically improve the quality and productivity of their lives.

SUMMARY

Some embodiments described herein relate to a progressive lens for reducing visual disparity. The lens comprises a distance portion and a reading portion. In some embodiments, the lens also includes an intermediate portion between the distance portion and the reading portion.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

The present embodiments relate to novel ophthalmic lenses having a first lens surface (concave) that is described by a fixed optical prismatic power that proceeds without inflection points of discontinuities across substantially the entire near useable optical area of this concave lens surface, and an opposite surface (convex) of the lens configured to cooperate with the prismatic power gradation of the first surface (concave) to provide a desired prismatic prescription, including at least one stabilized area of optical reading power. The prismatic power gradation of the first lens surface increases from one edge of the near usable area to substantially the opposite edge, and may increase according to linear or non-linear relationships. In another preferred embodiment, the two lens surfaces cooperate to create two stabilized areas of optical prismatic power, for a prescription with near-viewing values.

Figure 1:
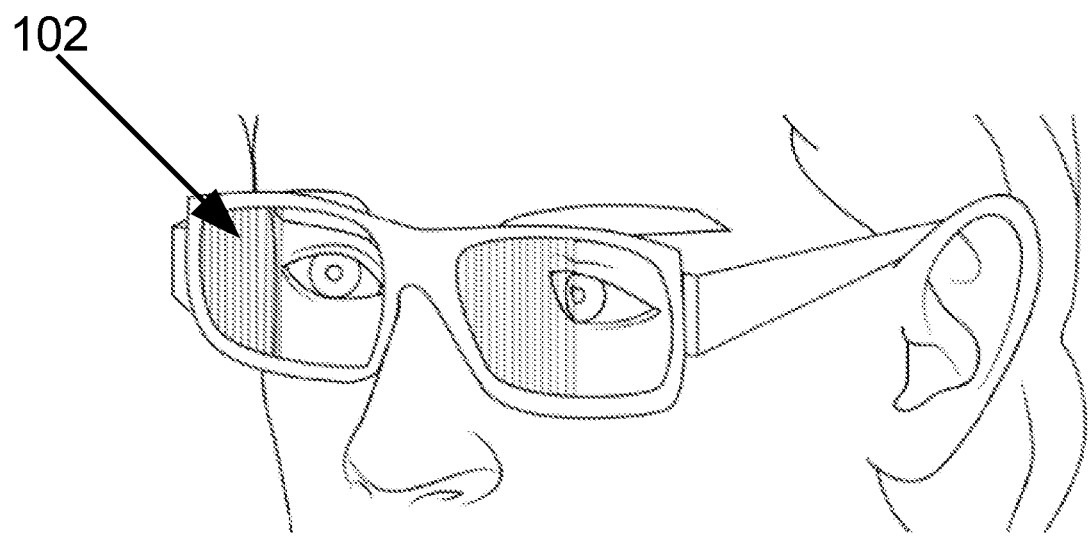
FIG. 1 illustrates prismatic lenses as known in the art.

The present embodiments described herein relate to a novel prismatic lens. As illustrated in FIG. 1, conventional prismatic lenses contain prisms 102 located on an interior side of a lens where the interior side is the side of the lens closest to the patient that is wearing glasses. This may also be referred to as an interior forward portion of a lens (i.e., a portion closest to a patient's eyes).

Conventional progressive and single vision lenses can only have a fixed amount of base in, base out, base up or base down on the lens that does not vary at any location on the lens. Binocular disparity at distance, intermediate and near vision varies, hence the design proposed herein relates to the manufacture of lenses using a CNC that will create a prism at a reading portion of the ophthalmic lens based on the difference in the binocular disparity at each patient's distance they are looking at through the lens.

The novel prismatic lens described herein comprises a prism on a reading portion of the lens that can have any theoretical value with no limitation on the amount of prism being prescribed. The advantage is that there is no manufacturing restriction which allows for a greater range of prescriptions not previously available using conventional methods of a single value of prism on the distance, intermediate and reading portion of the ophthalmic lens. The lens described herein may comprise a progressive lens for reducing near visual disparity. In some embodiments, the lens may comprise a distance portion and a reading portion. In some embodiments, the lens may comprise a distance portion, an intermediate portion and a reading portion. The distance portion comprises a fixed prism diopter power for a focal range greater than 6 ft from the lens. The fixed prism diopter power may be between 0 and 10 diopters. The reading portion comprises a prism configured for a focal range greater than 8 inches from the lens and less than 24 inches. The reading portion may include a fixed prism diopter power wherein the reading portion includes a fixed base in prism comprising a diopter power between 0 to 1.5 diopters greater than the fixed prism diopter power of the distance portion.

A progressive increase in plus power may exists from the distance portion of the lens to the reading portion of the lens including an intermediate portion if one exists in the lens.

The distance portion of the lens may comprise a zero, minus, or plus dioptric power with or without cylinder power. The novel lens described herein may have the following attributes that are not possible with conventional prismatic lenses. For example, an increase in plus power may range from 0 to +50.00 diopters (and greater) and an increase in minus power may range from −0.01 to −50.00 (and greater) with the limitation in producing the lens power being the limitations of the CNC. In some embodiments, an increase in total plus power may range from +0.25 to +50.00 diopters (and greater) and an increase in total minus power may range from −0.25 to −50.00 diopters (and greater) with the limitation in producing the lens power being the limitations of the CNC. In some embodiments, an increase in total minus cylinder power may range from −0.25 to −50.00 diopters (and greater) with the limitation in producing the lens power being the limitations of the CNC and an increase in total prism at the Prism Reference Point (PRP) may range from about 0.25 to about 50.00 prism diopters (and greater) with the limitation in producing the lens power being the limitations of the CNC. Increments may be performed in ranges.

Figure 2:
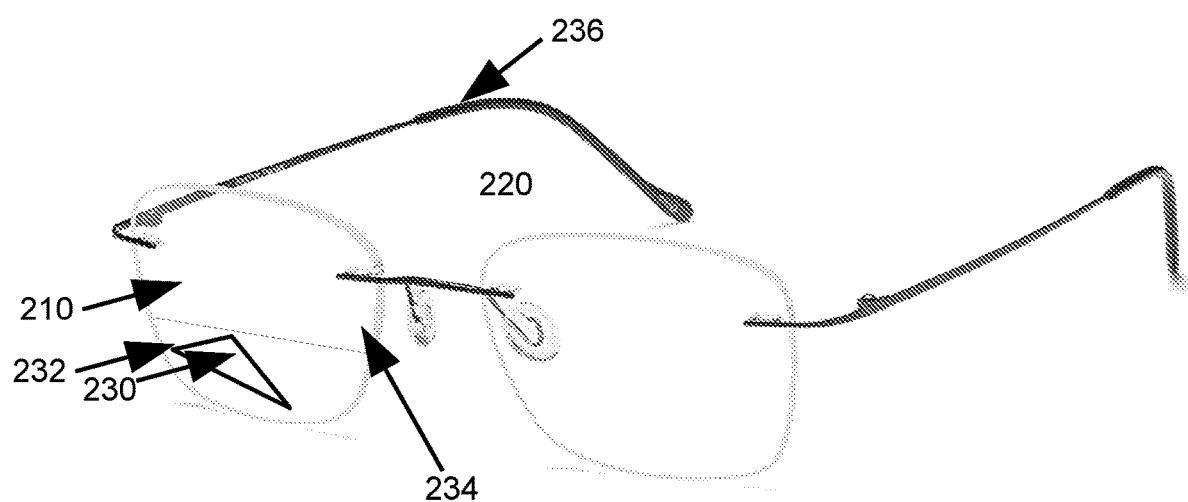
FIG. 2 illustrates a prismatic lens in accordance with some embodiments.
Figure 3:
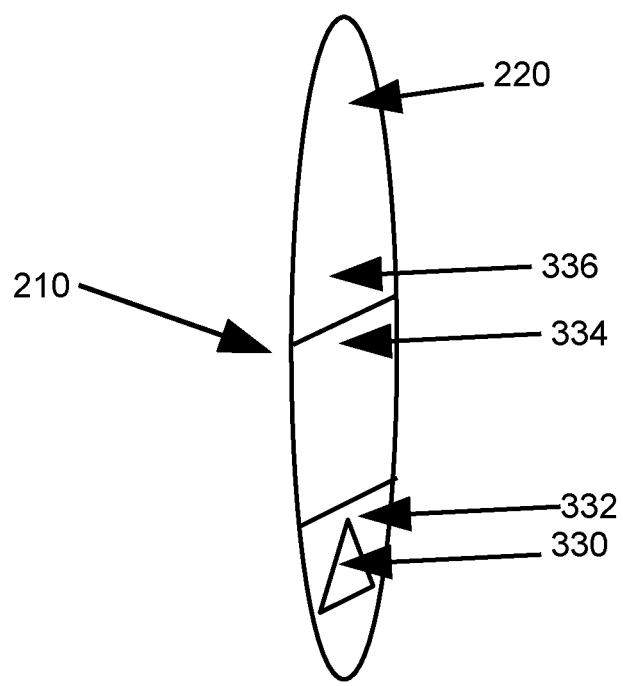
FIG. 3 illustrates a prismatic lens in accordance with some embodiments.

Referring now to FIG. 2 and FIG. 3, an embodiment of a lens 200 is illustrated. FIG. 2 illustrates a prismatic lens affixed to eyewear frames. As shown in FIG. 2., the lens 200 comprises a interior side 220, an exterior side 210 and a prism 230. The prism 230 may be affixed to the interior side 220 of the lens. The prism 230 may reside in a reading portion 232 of the lens 200. A distance portion 234 of the lens may comprise a fixed prism diopter power that ranges from 0 to 10 diopters. The reading portion 232 includes a fixed base in prism comprising a diopter power between 0 to 1.5 diopters greater than the fixed prism diopter power of the distance portion 234. The lens 200 may be affixed to a frame 236.

Similar to FIG. 2, FIG. 3 illustrates a lens 300 that comprises an interior side 220, an exterior side 210 and a prism 330. The prism 330 may be affixed to the interior side 220 of the lens. The prism 330 may reside in a reading portion 332 of the lens 300. A distance portion 336 of the lens may comprise a fixed prism diopter power that ranges from 0 to 10 diopters. The reading portion 332 includes a fixed base in prism comprising a diopter power between 0 to 1.5 diopters greater than the fixed prism diopter power of the distance portion 336. The intermediate portion 334 comprises a fixed prism diopter power between 0 and 10 diopters.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A progressive addition lens comprising:
    a distance portion comprising a fixed prism diopter power; and
    a reading portion including a fixed prism diopter power wherein the reading portion includes a fixed base in prism comprising a diopter power 1.5 diopters greater than the fixed prism diopter power of the distance portion.

2. The progressive addition lens of claim 1, wherein the fixed base in prism is induced by changing thickness of the progressive addition lens in different amounts from the distance portion to the reading portion.

3. The progressive addition lens of claim 1, wherein the fixed base in prism in the reading portion is induced by changing the thickness of the lens in the reading portion which is different than the thickness of the lens in the distance portion.

4. The progressive addition lens of claim 1, wherein the fixed base in prism is induced by de-centering an optical center of the progressive addition lens in different amounts from the distance portion to the reading portion.

5. The progressive addition lens of claim 1, wherein the fixed base in prism is induced by de-centering the near optical center of the progressive addition lens for a prescribed amount so as to change a near prism value to a specific prism value.

6. A progressive addition lens comprising:
    a distance portion comprising a first fixed prism diopter power;
    an intermediate portion comprising a second fixed prism diopter power; and
    a reading portion including a fixed base in prism comprising a diopter power 1.5 diopters greater than the first fixed prism diopter power of the distance portion.

7. A pair of glasses comprising:
    a frame; and
    a lens, wherein the lens comprises a distance portion comprising a first fixed prism diopter power, an intermediate portion comprising a second fixed diopter power, and a reading portion including a fixed base in prism comprising a diopter power 1.5 diopters greater than the fixed diopter power of the distance portion.

* * * * *